US007861133B2

(12) United States Patent
Kaiki

(10) Patent No.: US 7,861,133 B2
(45) Date of Patent: Dec. 28, 2010

(54) DIGITAL DEMODULATING APPARATUS, CONTROLLING METHOD OF THE APPARATUS, COMPUTER PROGRAM PRODUCT FOR THE APPARATUS, RECORDING MEDIUM RECORDING THEREON THE PRODUCT, AND DIGITAL RECEIVER

(75) Inventor: Nobuyoshi Kaiki, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1076 days.

(21) Appl. No.: 11/600,788

(22) Filed: Nov. 17, 2006

(65) Prior Publication Data

US 2007/0118788 A1 May 24, 2007

(30) Foreign Application Priority Data

Nov. 21, 2005 (JP) ............................. 2005-335323

(51) Int. Cl.
*H03M 13/00* (2006.01)
(52) U.S. Cl. ...................... 714/755; 348/723; 348/726; 375/240; 375/341
(58) Field of Classification Search ................. 714/755, 714/753, 758; 375/259, 341, 240; 348/723, 348/726
See application file for complete search history.

(56) References Cited

U.S. PATENT DOCUMENTS 6,675,000 B1 * 1/2004 Ichikawa ................. 455/127.3

| 6,707,806 | B1 * | 3/2004 | Kato | 370/336 |
|---|---|---|---|---|
| 7,693,224 | B2 * | 4/2010 | Rhodes | 375/260 |
| 2003/0142764 | A1 * | 7/2003 | Keevill et al. | 375/341 |
| 2004/0015765 | A1 * | 1/2004 | Cooper et al. | 714/750 |
| 2006/0215590 | A1 * | 9/2006 | Sharma et al. | 370/311 |

FOREIGN PATENT DOCUMENTS

JP 2001-251275 A 9/2001

* cited by examiner

*Primary Examiner*—Sam Rizk
(74) *Attorney, Agent, or Firm*—Birch, Stewart, Kolasch & Birch, LLP

(57) ABSTRACT

A digital demodulating apparatus comprises circuit elements constituting a tuner that performs channel select processing to an interleaved received signal, and a demodulator that demodulates the received signal; a deinterleaving section that deinterleaves the interleaved received signal; an error correcting section that corrects errors in the received signal deinterleaved by the deinterleaving section; and a circuit element controlling section that controls an operation of at least one of the circuit elements. The circuit element controlling section estimates the quantity of hypothetical errors in the received signal caused by a control of a circuit element. The circuit element controlling section judges from the estimated quantity of hypothetical errors whether the error correcting section can correct errors in the received signal caused by the control of the circuit element. The circuit element controlling section controls the circuit element so as to decrease the quantity of errors in the received signal caused by the control of the circuit element, when the circuit element controlling section decided that the error correcting section can not correct the errors in the received signal.

28 Claims, 9 Drawing Sheets

DIGITAL DEMODULATING APPARATUS, CONTROLLING METHOD OF THE APPARATUS, COMPUTER PROGRAM PRODUCT FOR THE APPARATUS, RECORDING MEDIUM RECORDING THEREON THE PRODUCT, AND DIGITAL RECEIVER

BACKGROUND OF THE INVENTION

1. Field of the Invention

The present invention relates to a digital demodulating apparatus that performs channel select processing and demodulation processing to a received signal that has been interleaved. The present invention relates also to a controlling method of the digital demodulating apparatus, a computer program product for the apparatus, a recording medium recording thereon the product, and a digital receiver.

2. Description of Related Art

A digital demodulating apparatus for demodulating a modulated signal, includes therein a tuner that performs channel select processing to the signal, and a demodulator that performs demodulation processing to the signal. A controller of the digital demodulating apparatus performs various controls for changing operation parameters of circuit elements that constitute the tuner and the demodulator.

However, some of the controls may cause errors in the signal being treated by the digital demodulating apparatus. JP-A-2001-251275 discloses a digital demodulating apparatus constructed so as to make a received signal hard to be affected by power control by turning the power of the apparatus on or off within each guard interval period.

However, the control of the digital demodulating apparatus of JP-A-2001-251275 can be performed only within each guard interval period. In addition, even when the control is performed within a guard interval period, there may be a case wherein the control affects the signal out of the guard interval period. If an error generated in the signal remains out of the guard interval period, it may bring about a problem that accurate information on, for example, an image or sound, can not be obtained from the signal demodulated.

SUMMARY OF THE INVENTION

An object of the present invention is to provide a digital demodulating apparatus capable of obtaining accurate information from a demodulated signal even when a control is performed in any of periods including guard interval periods, and also to provide a controlling method of the apparatus, a computer program product for the apparatus, a recording medium recording thereon the product, and a digital receiver.

A digital demodulating apparatus according to the present invention comprises a plurality of circuit elements constituting a tuner that performs channel select processing to a received signal that has been interleaved, and a demodulator that performs demodulation processing to the received signal from the tuner; a deinterleaving section that performs deinterleave processing to the interleaved received signal from the tuner; an error correcting section that corrects errors included in the received signal that has been deinterleaved by the deinterleaving section; and a circuit element controlling section that controls an operation of at least one of the plurality of circuit elements. The circuit element controlling section estimates the quantity of hypothetical errors to be generated in the received signal due to a control of an operation of a circuit element. The circuit element controlling section judges from the estimated quantity of hypothetical errors whether or not the error correcting section can correct errors to be included in the received signal due to the control of the operation of the circuit element. The circuit element controlling section controls the operation of the circuit element so as to decrease the quantity of errors to be generated in the received signal due to the control of the operation of the circuit element, when the circuit element controlling section has decided that the error correcting section can not correct the errors to be included in the received signal.

A controlling method according to the present invention is for controlling a digital demodulating apparatus comprising a plurality of circuit elements constituting a tuner that performs channel select processing to a received signal that has been interleaved, and a demodulator that performs demodulation processing to the received signal from the tuner; a deinterleaving section that performs deinterleave processing to the interleaved received signal from the tuner; an error correcting section that corrects errors included in the received signal that has been deinterleaved by the deinterleaving section; and a circuit element controlling section that controls an operation of at least one of the plurality of circuit elements. The method comprises an estimating step of estimating the quantity of hypothetical errors to be generated in the received signal due to a control of an operation of a circuit element by the circuit element controlling section; a correction possibility judging step of judging from the quantity of hypothetical errors estimated in the estimating step whether or not the error correcting section can correct errors to be included in the received signal due to the control of the operation of the circuit element by the circuit element controlling section; and a circuit element controlling step of allowing the circuit element controlling section to control the operation of the circuit element so as to decrease the quantity of errors to be generated in the received signal due to the control of the operation of the circuit element by the circuit element controlling section, when it was decided in the correction possibility judging step that the error correcting section can not correct errors to be included in the received signal.

A computer program product according to the present invention is used for a digital demodulating apparatus comprising a plurality of circuit elements constituting a tuner that performs channel select processing to a received signal that has been interleaved, and a demodulator that performs demodulation processing to the received signal from the tuner; a deinterleaving section that performs deinterleave processing to the interleaved received signal from the tuner; an error correcting section that corrects errors included in the received signal that has been deinterleaved by the deinterleaving section; and a circuit element controlling section that controls an operation of at least one of the plurality of circuit elements. The product causes the apparatus to perform an estimating step of estimating the quantity of hypothetical errors to be generated in the received signal due to a control of an operation of a circuit element by the circuit element controlling section; a correction possibility judging step of judging from the quantity of hypothetical errors estimated in the estimating step whether or not the error correcting section can correct errors to be included in the received signal due to the control of the operation of the circuit element by the circuit element controlling section; and a circuit element controlling step of allowing the circuit element controlling section to control the operation of the circuit element so as to decrease the quantity of errors to be generated in the received signal due to the control of the operation of the circuit element by the circuit element controlling section, when it was decided in the correction possibility judging step that the error correcting section can not correct errors to be included in the received signal.

According to the digital demodulating apparatus, the controlling method, and the computer program product of the present invention, the quantity of hypothetical errors expected to be generated due to a control of an operation of a circuit element is estimated before the control is actually performed. It is then judged whether or not the error correcting section can correct the quantity of hypothetical errors. When it has been decided that the errors can not be corrected, the circuit element is controlled so as to decrease errors to be generated due to the control. Therefore, more accurate information can be obtained from the demodulated signal. Because the judgment as to whether or not errors can be corrected is performed irrespective of the kind of period in which the control is performed, the control can be performed in a range in which there are less errors, in any of periods including a guard interval period.

According to the present invention, it is preferable that the circuit element controlling section changes the quantity of the control of the operation of the circuit element so as to decrease the quantity of errors to be generated in the received signal due to the control of the operation of the circuit element, when the circuit element controlling section has decided that the error correcting section can not correct the errors to be included in the received signal, and the circuit element controlling section does not change the quantity of the control of the operation of the circuit element when the circuit element controlling section has decided that the error correcting section can correct the errors to be included in the received signal. According to this feature, although the quantity of the control is changed when the errors can not be corrected, the quantity of the control is not changed when the errors can be corrected. Therefore, in the case that the errors can not be corrected, the control is performed so that it is ensured to obtain accurate information from the signal in which errors have been generated. Contrastingly, in the case that the errors can be corrected, a proper control of the circuit element can be ensured.

According to the present invention, it is preferable that the circuit element controlling section controls the circuit element so as not to change the operation of the circuit element, when the circuit element controlling section has decided that the error correcting section can not correct the errors to be included in the received signal. According to this feature, if a change in the operation of the circuit element causes errors that can not be corrected, the operation of the circuit element is not changed. This is substantially equivalent to that the control of the circuit element is not performed. Thus, it can be surely avoided that a control brings about errors that can not be corrected.

According to the present invention, it is preferable that the control to be performed by the circuit element controlling section is a control to change the power consumption of the circuit element. In the case of a control to change the power consumption, errors are apt to be generated in the signal. Even in such a case, a control can be performed to suppress the errors according to the above feature.

According to the present invention, it is preferable that the circuit element controlling section comprises a CN ratio estimating section that estimates a CN ratio of the received signal in which the hypothetical errors are to be generated due to the control of the operation of the circuit element. According to this feature, it can be accurately judged by the estimated CN ratio whether or not the errors can be corrected.

According to the present invention, it is preferable that the circuit element controlling section comprises a threshold deriving section that derives a threshold of a CN ratio of the received signal, and the circuit element controlling section decides that the error correcting section can correct the hypothetical errors to be included in the received signal due to the control of the operation of the circuit element by the circuit element controlling section, when a CN ratio of the received signal estimated by a CN ratio estimating section exceeds the threshold of the CN ratio of the received signal derived by the threshold deriving section. According to this feature, by using the threshold, it can be easily judged whether or not the errors can be corrected.

According to the present invention, it is preferable that the threshold deriving section derives the threshold of the CN ratio of the received signal on the basis of at least one of a demodulation method, a coding rate, and an effective symbol length of the received signal. According to this feature, a proper threshold can be derived in accordance with a signal system adopted for the received signal.

According to the present invention, it is preferable that the threshold deriving section is provided in the tuner, and the tuner receives, from the demodulator, information on at least one of the demodulation method, the coding rate, and the effective symbol length of the received signal. According to this feature, on the basis of information obtained in demodulation processing by the demodulator, accurate information for deriving a threshold can be obtained.

According to the present invention, it is preferable that the circuit element controlling section comprises an error quantity deriving section that derives the quantity of errors before control, included in the received signal before the control of the operation of the circuit element, and the circuit element controlling section judges from the estimated quantity of hypothetical errors and the quantity of errors before control derived by the error quantity deriving section whether or not the error correcting section can correct errors to be included in the received signal. According to this feature, because the quantity of errors originally included in the received signal before the control of the operation is derived, error correction possibility can be more accurately judged in accordance with the errors before the control.

In the digital demodulating apparatus according to the present invention, it is preferable that the error quantity deriving section comprises an error rate deriving section that derives an error rate of the received signal before the control of the operation of the circuit element by the circuit element controlling section. In the controlling method according to the present invention, it is preferable that the method further comprises an error rate deriving step of deriving an error rate of the received signal before the control of the operation of the circuit element by the circuit element controlling section, and it is judged in the correction possibility judging step from the quantity of hypothetical errors estimated in the estimating step and the error rate before control, derived in the error rate deriving step, whether or not the error correcting section can correct errors to be included in the received signal. According to these features, on the basis of the derived error rate, it can be more accurately judged whether or not the errors can be corrected.

According to the present invention, it is preferable that the error quantity deriving section comprises a deviation deriving section that derives a deviation, from a specified value, of constellation of the received signal before the control of the operation of the circuit element by the circuit element controlling section. According to this feature, on the basis of the derived deviation of constellation from the specified value, it can be more accurately judged whether or not the errors can be corrected.

According to the present invention, it is preferable that the circuit element controlling section comprises a timing determining section that determines a timing at which the circuit element controlling section controls the operation of the circuit element. According to this feature, on the basis of the judgment as to whether or not the errors can be corrected, the control can be performed at the optimum timing.

According to the present invention, it is preferable that the digital demodulating apparatus further comprises a wave equalizing section that performs wave equalization on the basis of reliability of a scattered pilot signal included in the received signal at the timing for controlling the circuit element, determined by the timing determining section. According to this feature, even when the reliability of the scattered pilot signal included in the received signal varies due to the errors generated due to the control, proper wave equalization can be performed in accordance with the reliability having varied.

According to the present invention, it is preferable that the timing determining section and the wave equalizing section are provided in the tuner and the demodulator, respectively, and the demodulator receives, from the tuner, information on the timing for controlling the circuit element, determined by the timing determining section. According to this feature, even in the case that the errors are corrected in the demodulator, proper error correction can be performed in accordance with the timing at which the control is performed.

According to the present invention, it is preferable that the timing determining section determines the timing for controlling the operation of the circuit element such that an error to be included in the received signal due to the control of the operation of the circuit element is put at a leading edge of one symbol included in the received signal. According to this feature, because the control is performed in time with the leading edge of the symbol, symbols to be affected by the errors generated due to the control can be suppressed to the minimum.

According to the present invention, it is preferable that the circuit element controlling section further comprises a performance changing section that changes the error correction performance of the error correcting section on the basis of reliability of the received signal at the timing for controlling the circuit element, determined by the timing determining section. According to this feature, even when the reliability of the received signal varies due to the errors generated due to the control, proper error correction can be performed in accordance with the reliability having varied.

According to the present invention, it is preferable that the timing determining section and the error correcting section are provided in the tuner and the demodulator, respectively, and the demodulator receives, from the tuner, information on the timing for controlling the circuit element, determined by the timing determining section. According to this feature, even in the case that the errors are corrected in the demodulator, proper error correction can be performed in accordance with the timing at which the control is performed.

According to the present invention, the tuner may comprise an RF amplifier section, a mixer section, a filter section, an IF amplifier section, and a VCO-PLL section, and at least one of the RF amplifier section, the mixer section, the filter section, the IF amplifier section, and the VCO-PLL section, may be to be controlled by the circuit element controlling section. According to this feature, each circuit element constituting the tuner can be optimally controlled on the basis of the judgment as to whether or not the errors can be corrected.

According to the present invention, it is preferable that the circuit element controlling section controls the circuit element such that regions occupied by errors to be generated due to a plurality of controls by the circuit element controlling section do not overlap each other in the deinterleaved received signal. According to this feature, because the control is performed such that errors due to the control do not overlap after deinterleave processing, the errors to be generated due to the control can be suppressed within a range in which the errors can be corrected.

According to the present invention, the deinterleave processing to be performed by the deinterleaving section may be time deinterleave processing in which a plurality of symbols included in the received signal are temporally rearranged, and the number of times of controls of the operation of the circuit element by the circuit element controlling section in a range of a time interleaving length may be not more than one. According to this feature, because errors generated due to the control do not overlap after time deinterleave processing, the errors to be generated due to the control can be suppressed within a range in which the errors can be corrected.

According to the present invention, it is preferable that the deinterleave processing to be performed by the deinterleaving section is time deinterleave processing in which a plurality of symbols included in the received signal are temporally rearranged; the circuit element controlling section comprises an error symbol specifying section that specifies an error symbol in which a hypothetical error is generated due to the control of the operation of the circuit element; and the circuit element controlling section judges from the quantity of hypothetical errors estimated by the circuit element controlling section and the error symbol specified by the error symbol specifying section whether or not the error correcting section can correct errors to be included in the received signal due to a plurality of times of controls by the circuit element controlling section when the circuit element controlling section performs the plurality of times of controls in a range of a time interleaving length. According to this feature, even in the case that a plurality of controls are performed in the range of a time interleaving length, the controls can be performed within a range in which the errors can be corrected. In addition, by specifying a symbol in which errors are generated, it can be more specifically evaluated how many errors are generated in which range. Therefore, it can be more properly judged whether or not the errors can be corrected.

The digital demodulating apparatus according to the present invention can be adopted in various digital receivers such as cellular phones and digital television receivers, which performs reproduction processing to character data, image data, audio data, and program data. Such a digital receiver obtains information on the character data, image data, audio data, and program data, from the received signal demodulated by the digital demodulating apparatus of the present invention, to reproduce characters and so on.

The computer program product according to the present invention can be distributed by being recorded on a computer-readable recording medium of a removable recording medium such as a compact disc read only memory (CD-ROM) disk, a flexible disk (FD), or a magneto optical (MO) disk, or a fixed recording medium such as a hard disk. Alternatively, the computer program product can be distributed by wired or wireless electrical communication means through a communication network such as the Internet. The computer program product may not be exclusive to the digital demodulating apparatus. It may be a program that cooperates with a program for channel select processing and digital demodulation processing to cause a general-purpose processor to function as the digital demodulating apparatus.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Hereinafter, a digital demodulating apparatus according to an embodiment of the present invention will be described. FIG. 1B shows a general construction of the digital demodulating apparatus 1. In this specification, a "circuit element" means a circuit element that constitutes a tuner, or a circuit element that constitutes a demodulator. More specifically, the "circuit element" can correspond to any unit part, for example, a circuit that constitutes each section of the tuner 2 shown in FIG. 2; a circuit that constitutes each section of the demodulator 3 shown in FIG. 4A; or a circuit element equivalent to one transistor that constitutes one of the circuits.

Figure 1A:
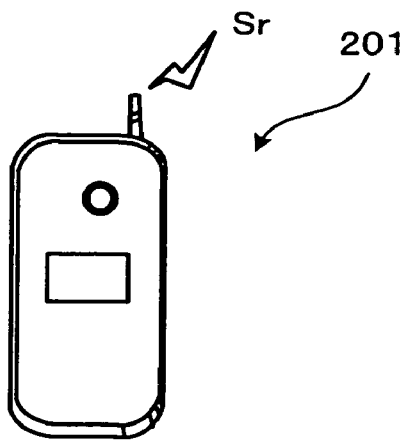
FIG. 1A is an external view of a digital receiver according to an embodiment of the present invention.
Figure 1B:
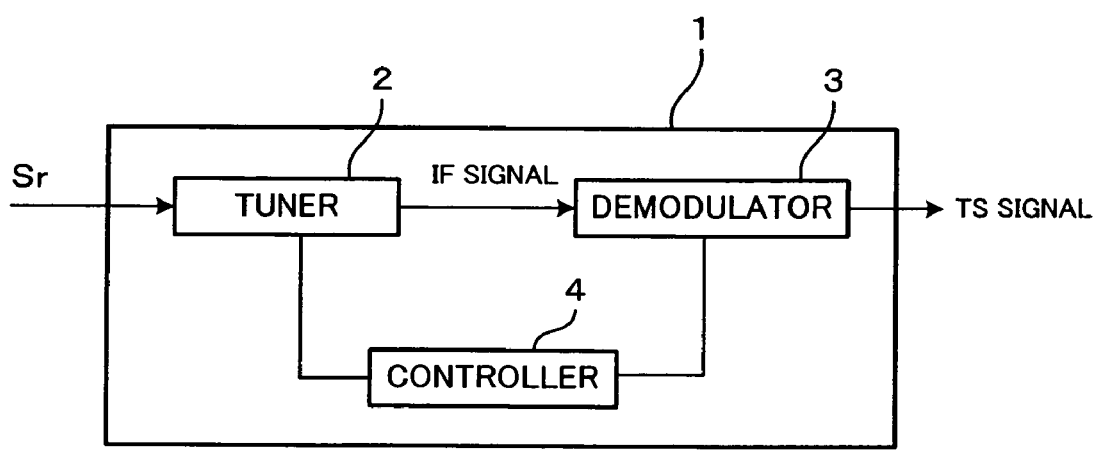
FIG. 1B is a block diagram showing a general construction of a digital demodulating apparatus included in the receiver of FIG. 1A.

The digital demodulating apparatus 1 of this embodiment is provided in a cellular phone 201, as a digital receiver, as shown in FIG. 1A. A signal Sr received by the cellular phone 201 through its antenna is demodulated by the digital demodulating apparatus 1. Information on characters, an image, and sound, is taken out from a demodulated signal output from the digital demodulating apparatus 1. The characters, image, and sound are then reproduced to be provided to a user of the cellular phone 201 through a not-shown display and a not-shown speaker provided on the phone 201. Note that the digital demodulating apparatus 1 may be adopted in another digital receiver than such a cellular phone, for example, a digital television receiver, a wireless LAN device, or a personal computer using wireless LAN.

As shown in FIG. 1B, the digital demodulating apparatus 1 includes therein a tuner 2, a demodulator 3, and a controller 4. The tuner 2 is electrically connected to the demodulator 3. The tuner 2 is also electrically connected to an antenna and so on to receive a signal through the antenna and so on. The tuner 2 amplifies the received signal Sr and convert it into an intermediate frequency (IF) signal Si, which is sent to the demodulator 3. The demodulator 3 receives the IF signal sent from the tuner 2, demodulates the IF signal, and outputs the demodulated signal. When the ISDB-T system as will be described later, is adopted, the demodulated signal from the demodulator 3 is a transport stream (TS) signal. The controller 4 controls the operations of the tuner 2 and demodulator 3.

Each circuit element that constitutes the tuner 2, demodulator 3, and controller 4, may be a circuit section made up of a plurality of circuits constructed so as to serve each function; or may be realized by general-purpose CPU, RAM, etc., and a computer program that makes the CPU operate so as to serve each function as will be described later. In the latter case, a controlling section 4, a demodulator controlling section 5, an FFT section 33, etc., as will be described later, are realized by combining the hardware such as the CPU and the computer program.

[Tuner]

Figure 2:
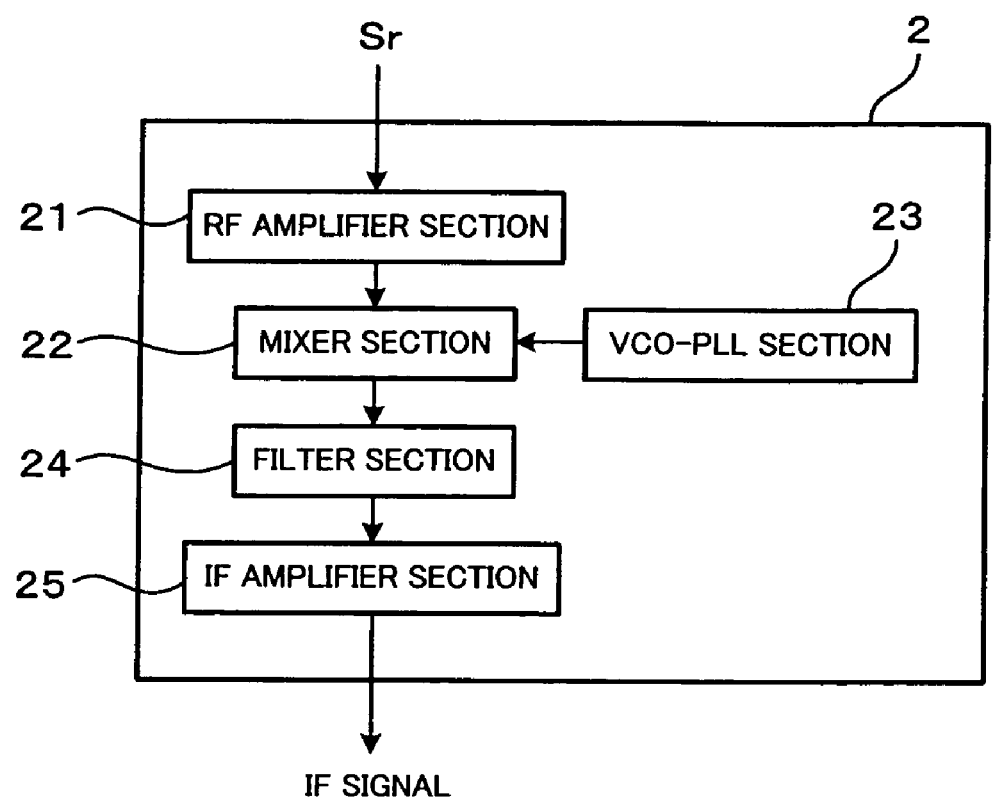
FIG. 2 is a block diagram showing a construction of a tuner included in the apparatus of FIG. 1B.

Next, the tuner 2 will be described. FIG. 2 is a block diagram showing a construction of the tuner 2.

The tuner 2 includes therein an RF amplifier section 21, a mixer section 22, a VCO-PLL section 23, a filter section 24, and an IF amplifier section 25. The signal Sr received by the tuner 2 is amplified by the RF amplifier section 21, and then sent to the mixer section 22. In accordance with a channel control signal sent from the controller 4, the VCO-PLL section 23 generates a mixing signal based on a frequency corresponding to a specific channel, which is channel select processing. The mixing signal generated by the VCO-PLL section 23 is sent to the mixer section 22. The mixer section 22 mixes the signal Sr sent from the RF amplifier section 21 and the mixing signal sent from the VCO-PLL section 23 to generate an IF signal Si according to an IF frequency.

The IF signal generated by the mixer section 22 is sent to the filter section 24. The filter section 24 removes unnecessary signal components from the IF signal sent from the mixer section 22. The IF signal from which the unnecessary signal components have been removed, is sent to the IF amplifier section 25, amplified by the IF amplifier section 25, and then sent to the demodulator 3.

[Received Signal]

Next, the received signal received by the tuner 2 will be described. As an example of this embodiment, a case will be described wherein a transmission system according to Japanese digital terrestrial broadcasting is adopted for the transmission of the signal Sr. In this case, the signal Sr received by the tuner 2 is according to the integrated services digital broadcasting-terrestrial (ISDB-T) system. As the transmission method for the ISDB-T system, the orthogonal frequency division multiplexing (OFDM) method is adopted.

The received signal of the digital demodulating apparatus according to this embodiment suffices if the OFDM method is adopted for the signal. Thus, other than the ISDB-T system, the digital audio broadcasting (DAB) system, the digital video broadcasting-terrestrial (DVB-T) system, or the digital video broadcasting-handheld (DVB-H) system in Europe; the digital multimedia broadcasting (DMB) system in Korea; or the IEEE802.11a/b/g/n system used for a wireless LAN may be adopted. Further, the present invention may be applied to a cable television system or the like with no antenna in which the OFDM method and a guard interval method are adopted.

The OFDM method is a transmission method as follows. This method is a multicarrier method in which a plurality of carrier waves different in frequency are used for data transmission. The carrier waves used in the OFDM method have their wave forms orthogonal to each other. Here, "two waves are orthogonal" means that the value is zero when the functions each representing the amplitude of the wave to time are multiplied by each other and then temporally integrated in an integration region corresponding to one cycle, that is, the inner product of the functions is zero.

Upon data transmission, the carrier waves are modulated (or mapped) in accordance with each value of data to be transmitted. A plurality of carrier waves thus modulated (or mapped) are superimposed. Thus, an OFDM signal is generated by modulating the carrier waves in accordance with data values and superimposing a number of modulated carrier waves. In the OFDM method, thus generating an OFDM signal is equivalent to performing inverse Fourier transform. In the below description, an effective symbol length means the inverse of a frequency separation of carrier waves used in the OFDM method.

In order to eliminate affection of delayed waves other than a direct wave, a guard interval is inserted in the modulated signal in which a plurality of carrier waves modulated as described above are superimposed. The guard interval is made in the manner that part of one end of a signal of each effective symbol length of the modulated signal is copied and inserted to the other end of the signal of the effective symbol length. The modulated signal into which the guard interval has been inserted, is transmitted as an OFDM signal.

The signal made up of the signal of an effective symbol length and a guard interval is referred to as one symbol. The OFDM signal is constructed as a series of a plurality of symbols. When a signal is received in which the OFDM signal and a reflected wave that reaches the reception side with being delayed in time, are superimposed, the received signal includes therein a portion in which signals included in different symbols are superimposed. The guard interval is used for taking out a portion in which signals included in different symbols are not superimposed.

In digital terrestrial broadcasting, encoding is performed to the data to be transmitted by the OFDM signal in order to correct errors caused by noise and interference waves generated in the transmission path. For encoding used are Reed-Solomon (RS) coding and Viterbi coding. In the RS coding used in digital terrestrial broadcasting, the later 16 bytes of the data of 204 bytes to be transmitted serve as check bits, and an error of eight bytes of 204 bytes can be corrected at the maximum.

In the Viterbi coding, the coding rate k/n is standardized to ½ to ⅞ where n represents the number of bits of encoded data to be transmitted and k represents the number of bits of data before encoding. To restore the data that has been RS-encoded and Viterbi-encoded, RS decoding and Viterbi decoding are performed on the reception side. In this embodiment, "error correction is possible" means a case wherein the bit error rate after decoding is not more than a predetermined value. For example, when the bit error rate is not more than $1\times10^{-11}$ after RS decoding, error correction by RS decoding and Viterbi decoding is possible.

In accordance with conditions of a transmission path, there is a case wherein burst error arises in which errors concentrate temporally or in frequency in a transmitted signal. On the other hand, after Viterbi decoding to restore a Viterbi-coded signal, in general, there are many cases wherein burst error arises. In the case that errors generated in a signal of a certain length are to be corrected by an error correction method as described above, there is a limit in the number of errors that can be corrected in the signal of the length. Therefore, if the burst error as described above arises, there may be a case wherein error correction is impossible.

In digital terrestrial broadcasting, various kinds of interleave processing are performed to data to be transmitted by transmitted signals, in order to make error correction possible even if burst errors arise in the transmitted signals. As the interleave processing, there are known bit interleave processing, byte interleave processing, time interleave processing, and frequency interleave processing. The interleave processing as described above is to rearrange temporally or in frequency, data corresponding to signals included in a transmitted signal. In particular, time interleave processing is used for temporally rearranging a plurality of signals successive temporally. Frequency interleave processing is used for rearranging in frequency at random, a plurality of carrier waves continuous in frequency. For example, time interleave processing and time deinterleave processing for restoring time-interleaved data, are performed as follows.

Figure 3:
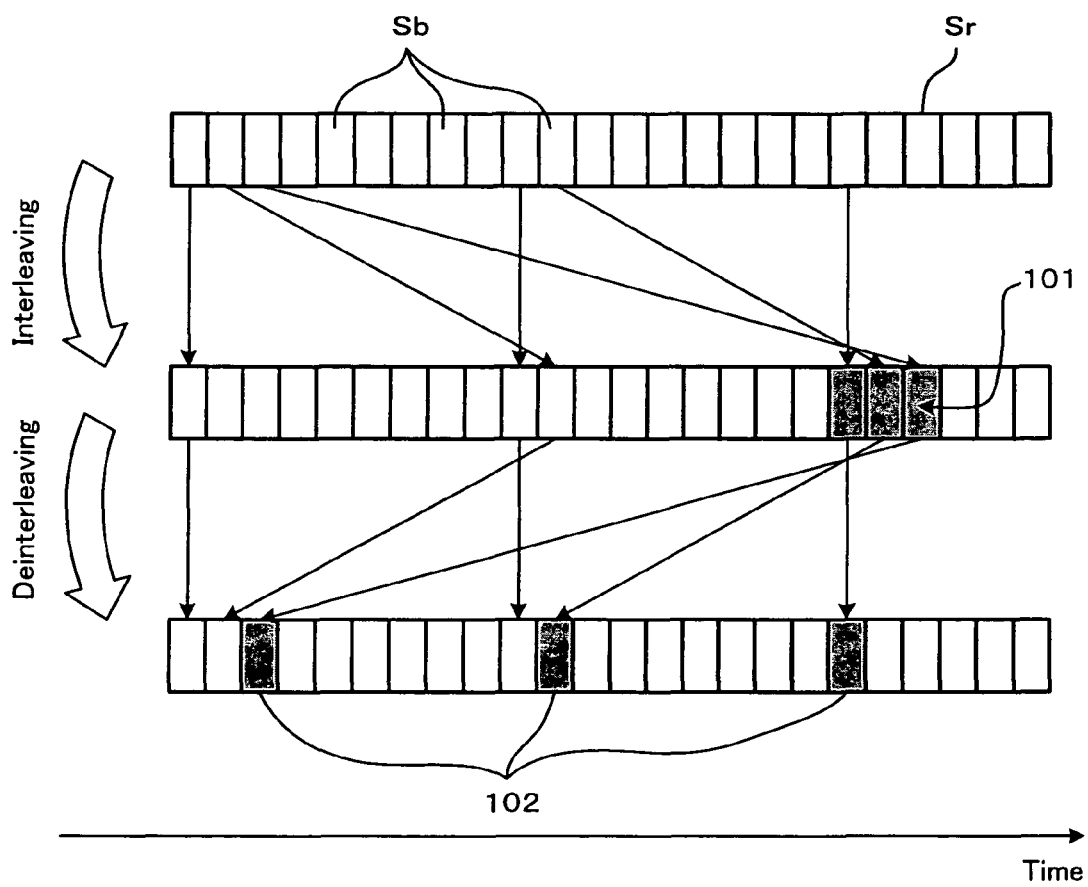
FIG. 3 is a representation showing an example of interleaving and deinterleaving performed and to be performed to a signal received by the tuner of FIG. 2.

FIG. 3 is a representation showing an example of time interleave and deinterleave processing. FIG. 3 shows three signals before and after interleave and deinterleave processing. As shown in FIG. 3, each signal is constituted by a plurality of symbols Sb successive temporally.

An OFDM signal Sr constituted by a plurality of modulated carrier waves is rearranged by time interleave processing in a predetermined order in a unit of data corresponding to the length of each symbol Sb, as shown in FIG. 3. When the signal corresponding to the data thus rearranged is transmitted, a burst error 101 arises in part of the signal in accordance with conditions of the transmission path. After receiving the signal, time deinterleave processing is performed on the reception side. Data once rearranged by time interleave processing is restored to its original order by time deinterleave processing. By this, the burst error 101 having arisen over a plurality of symbols in the transmission path is dispersed to errors 102 of the respective symbols by time deinterleave processing.

As shown in FIG. 3, rearranging is performed by time interleave processing such that each symbol is shifted to a position temporally later than its original position before time interleave processing. In addition, signals of symbols included in carrier waves different in frequency are included in temporally different positions in the signal after rearrangement, respectively.

As described above, even when a burst error arises in which errors concentrate temporally, error correction is possible because the errors are dispersed after time deinterleave processing.

In byte interleave processing, a signal is rearranged in a unit of byte such that data is dispersed in a unit of 204 bytes of RS-encoding. In bit interleave processing, a signal is rearranged in a unit of bit. In frequency interleave processing, symbols are rearranged over carrier waves included in an OFDM signal Sr.

In digital terrestrial broadcasting, in addition to the above, energy dispersal processing is performed to prevent energy bias in a transmitted signal due to data bias. The energy dispersal processing is performed by implementing an exclusive OR operation in a unit of bit between pseudorandom data and data according to the transmitted signal to make data random.

[Demodulator]

Figure 4A:
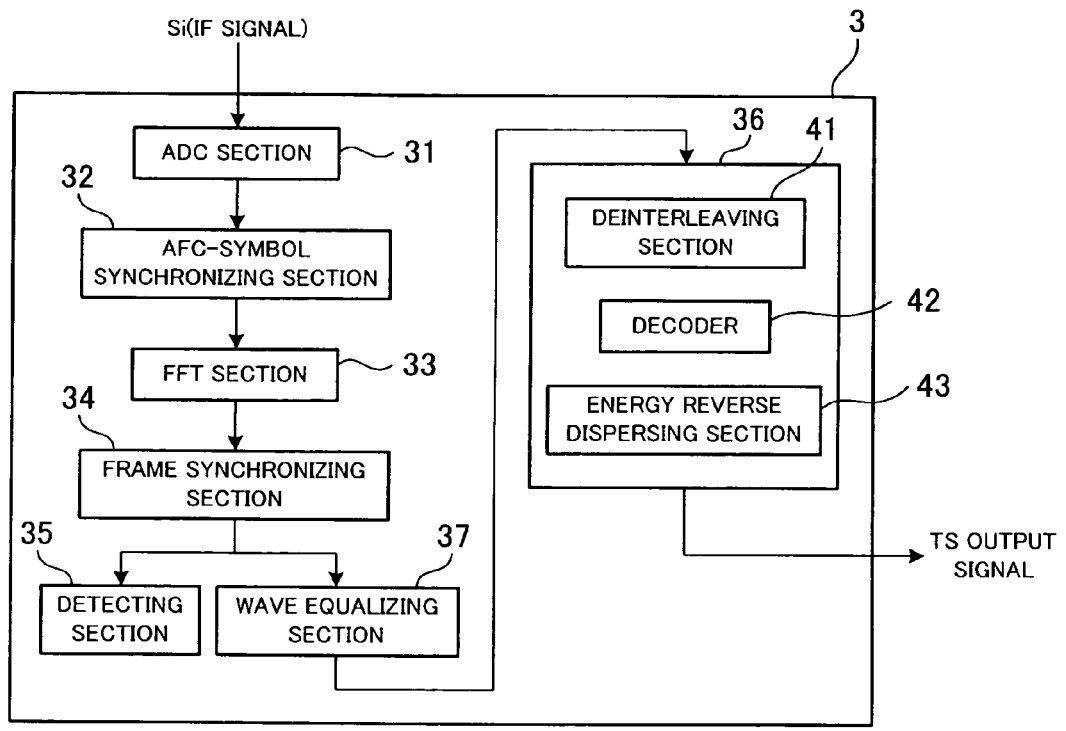
FIG. 4A is a block diagram showing a construction of a demodulator included in the apparatus of FIG. 1B.
Figure 4B:
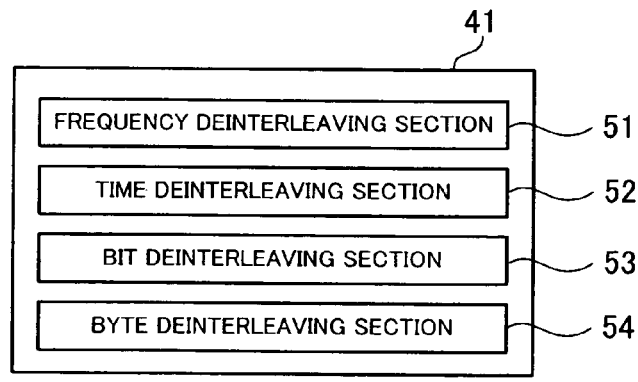
FIG. 4B is a block diagram showing a construction of a deinterleaving section included in the demodulator of FIG. 4A.
Figure 4C:
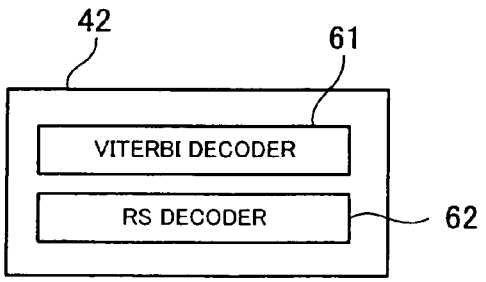
FIG. 4C is a block diagram showing a construction of a decoder included in the demodulator of FIG. 4A.

Next, the demodulator 3 will be described. FIG. 4A is a block diagram showing a construction of the demodulator 3.

As shown in FIG. 4A, the demodulator 3 is made up of a plurality of parts such as an ADC section 31 as described below.

The demodulator 3 includes therein an ADC section 31, an AFC-symbol synchronizing section 32, a fast Fourier transform (FFT) section 33, a frame synchronizing section 34, a detecting section 35, a wave equalizing section 37, and an error correcting section 36. The demodulator 3 performs demodulation processing and error correction processing to an IF signal.

An IF signal sent from the tuner 2 is input to the ADC section 31. The ADC section 31 converts the input analogue IF signal into a digital signal, and sends the converted digital signal to the AFC-symbol synchronizing section 32. The AFC-symbol synchronizing section 32 performs correction processing such as filter processing to the digital signal sent from the ADC section 31. The AFC-symbol synchronizing section 32 determines the start point of Fourier transform by the FFT section 33 as will be described later, that is, a symbol synchronization point. The AFC-symbol synchronizing section 32 then sends the synchronized digital signal to the FFT section 33. Further, the AFC-symbol synchronizing section 32 derives information on a mode indicating an effective symbol length, and sends the information to a controlling section 4. In this embodiment, modes indicating effective symbol lengths include a mode 1 of an effective symbol length of 252 microseconds, a mode 2 of an effective symbol length of 504 microseconds, and a mode 3 of an effective symbol length of 1008 microseconds.

When a symbol synchronization point is determined, a point that makes it possible to realize the most suitable reception having the least affection of a delayed wave reaching with a delay, and so on, is set to the synchronization point. As a method of determining the synchronization point, a method in which correlation of signals is referred to; a method in which phase shift is corrected by using a pilot signal; or the like, is used.

The FFT section 33 converts by Fourier transform, that is, by time-frequency transform, the digital signal sent from the AFC-symbol synchronizing section 32. For this Fourier transform, so-called fast Fourier transform (FFT) is used in general. Because the digital signal is an OFDM signal, it has its waveform that has been converted by inverse Fourier transform, that is, its waveform in which a plurality of carrier waves modulated in accordance with data values are superimposed. The FFT section 33 takes out the plurality of carrier waves modulated in accordance with data values, from the thus superimposed wave. The FFT section 33 then rearranges digital signals corresponding to data values distributed to the respective carrier waves, so that the signals are temporally arranged in the original order of data. The FFT section 33 thereby reproduces a digital signal corresponding to data before generation of the OFDM signal. The FFT section 33 then sends the digital signal to the frame synchronizing section 34.

The frame synchronizing section 34 synchronizes the digital signal sent from the FFT section 33, in a unit of frame. One frame is constituted by, for example, 204 symbols, and a batch of TMCC information is obtained from one frame signal. The digital signal synchronized by the frame synchronizing section 34 is sent to the wave equalizing section 37 and also to the detecting section 35.

On the basis of a scattered pilot signal or the like included in the digital signal, the wave equalizing section 37 performs wave equalization processing to the digital signal that has been synchronized by the frame synchronizing section 34. After correcting the signal by wave equalization, the wave equalizing section 37 demodulates (or demaps) the signal into a digital signal corresponding to data values, and then sends the demodulated (or demapped) digital signal to the error correcting section 36. In addition, on the basis of the scattered pilot signal or the like included in the digital signal, the wave equalizing section 37 derives the difference between the constellation of each equalized carrier wave and a specified value, in this case, the wave equalizing section 37 serves as deviation deriving means. The wave equalizing section 37 takes out information on a modulation error ratio (MER) or a CN ratio of the received signal, from the derived difference between the constellation and the specified value. The wave equalizing section 37 then sends the MER or CN ratio to the controller 4.

The detecting section 35 takes out TMCC information included in the digital signal. The detecting section 35 sends the taken-out information on TMCC to the controller 4. The TMCC information contains therein information on a transmission system such as a modulation method for carrier waves, such as 64QAM, 16QAM, or QPSK; a convolution coding rate of, for example, $1/2$, $2/3$, $3/4$, $5/6$, or $7/8$; guard interval lengths; and so on. As the guard interval lengths adopted are $1/4$, $1/8$, $1/16$, and $1/32$ of the length of an effective symbol.

As shown in FIG. 4A, the error correcting section 36 includes therein a deinterleaving section 41, a decoder 42, and an energy reverse dispersing section 43. The deinterleaving section 41 performs deinterleave processing to the digital signal sent from the wave equalizing section 37. As the deinterleaving processing, there are frequency deinterleave processing, time deinterleave processing, bit deinterleave processing, and byte deinterleave processing, which correspond to the respective kinds of interleave processing as described above. The digital signal to which various kinds of interleave processing have been performed is restored by the above kinds of deinterleave processing to the digital signal before interleaving.

The decoder 42 decodes the digital signal sent from the wave equalizing section 37. The decoding processing includes Viterbi decoding processing and RS decoding processing. The digital signal that has been Viterbi-encoded and RS-encoded is restored by the above decoding processing to a digital signal before encoding.

The energy reverse dispersing section 43 restores the digital signal sent from the detecting section 35, to a digital signal before energy dispersal.

These kinds of deinterleaving, decoding, and energy reverse dispersing are performed in an order corresponding to the order in which the kinds of interleaving, encoding, and energy dispersing were performed on the transmission side. In the case of ISDB-T demodulation, processing is performed in the order of frequency deinterleaving, time deinterleaving, bit deinterleaving, Viterbi decoding, byte deinterleaving, energy reverse dispersal, and RS decoding.

On the basis of the number of corrected errors, the error correcting section 36 calculates a bit error rate of the digital signal, in this case, the error correcting section 36 serves as error rate deriving means. The error correcting section 36 sends the calculated bit error rate to the controller 4. The bit error rate may be the rate of the number of bits corrected by Viterbi decoding and RS decoding, to the number of bits of the signal immediately after bit deinterleave processing. Alternatively, it may be the rate of the number of bits corrected by RS decoding, to the number of bits of the signal immediately after byte deinterleave processing.

[Control Based on Judgment as to Whether Error Correction is Possible or Impossible]

The controller 4 performs various kinds of controls for operations of each circuit element of the tuner 2 and demodulator 3. For example, the controller 4 controls the power consumption of each of the RF amplifier section 21, mixer section 22, VCO-PLL section 23, filter section 24, and IF amplifier section 25 included in the tuner 2, so as to lower the power consumption of the whole of the digital demodulating apparatus 1. Or, the controller 4 controls each circuit element of the tuner 2 and demodulator 3 so as to keep the intensity of the signal Si constant, for example, by changing the degree of amplification for the received signal or switching to an amplifier different in the degree of amplification, in accordance with the intensities of input signals to the RF amplifier section 21 and the IF amplifier section 25.

Figure 5:
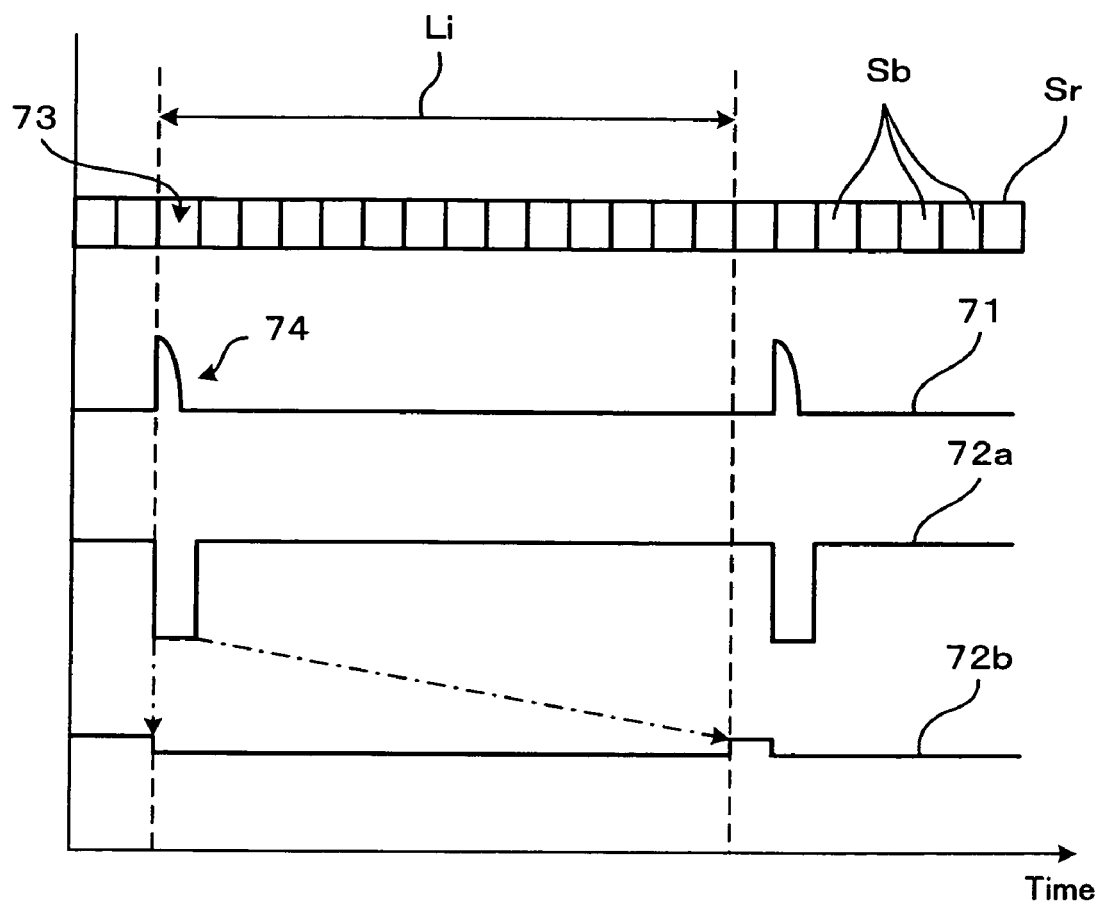
FIG. 5 is a timing chart showing affection on a signal, of a control of a controller included in the apparatus of FIG. 1B.

Some of the controls of the controller 4 as described above may cause generation of an error in the received signal. FIG. 5 is a timing chart showing affection of a control of the controller 4 on a signal Si. A curved line 71 represents the intensity of noise generated due to the control of the controller 4. The curved line 71 shows generation of noise 74 within the range of a symbol 73 of symbols Sb included in the signal Si. The generation of the noise 74 brings about generation of an error in the signal Si.

To take the affection of the noise into consideration, a CN ratio as shown by the following Expression 1 is used. In the Expression 1, Cd and Nd represent electric powers of a carrier wave and noise per one symbol.

$$(CN \text{ ratio}) = 10\log\left(\frac{C_d}{N_d}\right) \quad \text{[Expression 1]}$$

In noises, there is noise generated due to a control of the controller 4. Other than such noise, there is total noise of noise included in the received signal Sr and noise generated in the term in which the tuner 2 receives the signal Sr and converts it into an IF signal Si. When the electric power of the former noise is represented by Ni and the electric power of the latter noise is represented by No, the CN ratio of the symbol 73 including the noise 74 shown by the curved line 71 of FIG. 5 is given by the following Expression 2.

$$(CN \text{ ratio}) = 10\log\left(\frac{C_d}{N_o + N_i}\right) \quad \text{[Expression 2]}$$

A curved line 72a represents the CN ratio of the signal Si obtained thus. In the below description, if not otherwise specified, it is assumed that there is no temporal change in noise generated till the tuner 2 receives the signal Si, and thus the reception is in stable condition. Therefore, the CN ratio represented by the curved line 72a drops in the range of the symbol 73 due to the noise 74 and is kept at a certain value in the other ranges.

When the error correcting section 36 performs error correction after the control of the controller 4, deinterleave processing is performed to the signal Si. In the deinterleave processing, time deinterleaving disperses the affection of the noise 74 having appeared on the curved line 72a, evenly in a range shown by arrows of alternate long and short dash lines in FIG. 5. Thus, an equivalent CN ratio of the signal after deinterleave processing is given by a curved line 72b. In this example, the range in which the affection of the noise 74 is dispersed, coincides with the range in which the signal included in the symbol 73 is dispersed by time deinterleaving, that is, the range of the interleaving length Li.

By thus dispersing the affection of the noise 74 over the time interleaving length Li, the equivalent CN ratio represented by the curved line 72b is given by the following Expression 3. In the Expression 3, n represents the number of symbols included in the range of the time interleaving length Li.

$$(\text{equivalent } CN \text{ ratio}) = 10\log\left(\frac{nC_d}{nN_o + N_i}\right) \quad \text{[Expression 3]}$$

Figure 6:
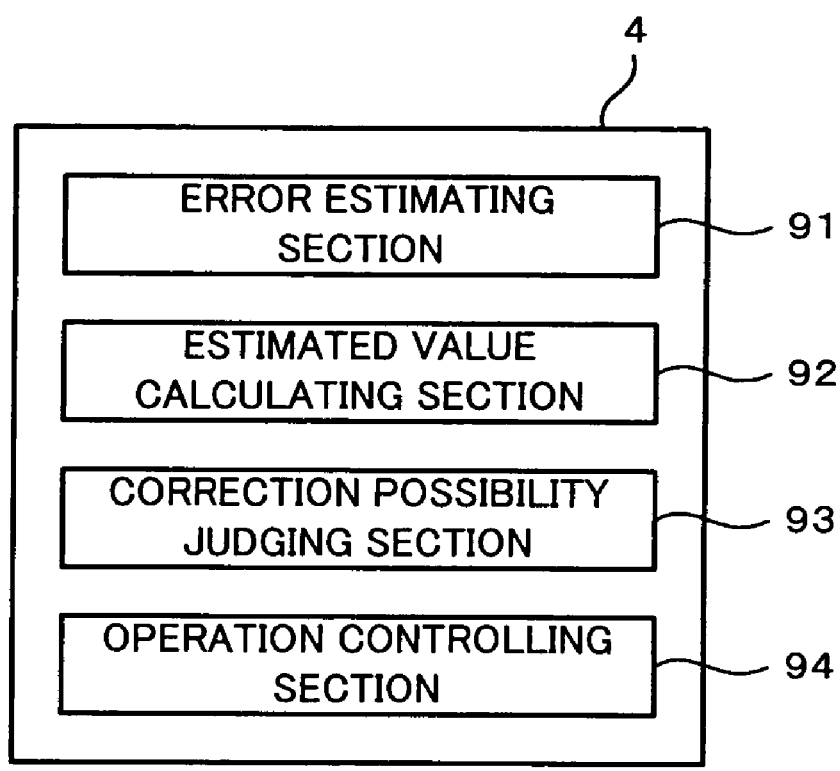
FIG. 6 is a block diagram showing a construction of the controller.

In accordance with the fact that an error generated due to a control of the controller 4 is thus dispersed by time deinterleaving, the controller 4 controls the operation of each circuit element of the tuner 2 and demodulator 3 as follows. FIG. 6 is a block diagram showing a construction of the controller 4. The controller 4 includes therein an error estimating section 91, an estimated value calculating section 92, a correction possibility judging section 93, and an operation controlling section 94.

The error estimating section 91 estimates a quantity of hypothetical errors that will be generated in the signal Si if the controller 4 controls the operation of each circuit element of the tuner 2 and demodulator 3. More specifically, a quantity of noise corresponding to the quantity of errors generated due to the control is derived from the circuit element to be controlled by the controller 4, and/or the degree of the control. Or, the error estimating section 91 may obtain the noise quantity Ni to be generated, from a function of noise quantity about those parameters with respect to the circuit element and/or the degree of the control.

The estimated value calculating section 92, which serves as CN ratio estimating means, calculates an equivalent CN ratio given by the Expression 3, from the noise quantity Ni derived by the error estimating section 91, an mode of an effective symbol length sent from the AFC-symbol synchronizing section 32, TMCC information sent from the detecting section 35, and information on CN ratio sent from the wave equalizing section 37. More specifically, the estimated value calculating section 92 obtains the mean value of Cd and No, which is the error quantity before control, in the range of a time interleaving length, from the information on CN ratio, the mode of the effective symbol length, and information on time interleaving included in the TMCC information, sent from the demodulator 3. The estimated value calculating section 92 then calculates the equivalent CN ratio by using the Expression 3, from the mean value of Cd and No and the noise quantity Ni derived by the error estimating section 91.

On the basis of the equivalent CN ratio calculated by the estimated value calculating section 92, the correction possibility judging section 93 judges whether or not errors in the signal Si can be corrected by RS decoding and Viterbi decoding in the error correcting section 36. More specifically, the correction possibility judging section 93 holds therein a threshold for the equivalent CN ratio. When the equivalent CN ratio calculated by the estimated value calculating section 92 exceeds the threshold, the correction possibility judging section 93 decides that correction is possible. Contrastingly, when the equivalent CN ratio calculated by the estimated value calculating section 92 is not more than the threshold, the correction possibility judging section 93 decides that correction is impossible.

The threshold for the equivalent CN ratio held in the correction possibility judging section 93 is set to the minimum value at which error correction is possible by RS decoding and Viterbi decoding. However, the minimum value at which error correction is possible, varies in accordance with modulating methods of carrier waves, the coding rates of convolution coding, and so on. Therefore, the correction possibility judging section 93 holds therein a table showing correspondence between modulating methods of carrier waves and so on and various thresholds, and obtains a proper threshold from the table and TMCC information, in this case, the correction possibility judging section 93 serves as threshold deriving means.

In the case that the signal Si is in unstable condition, the threshold for the equivalent CN ratio may be set to a value larger than the above minimum value at which error correction is possible. Thereby, even in the case that the CN ratio varies or the signal decreases in intensity in a short period of time, the correction possibility judging section 93 can more surely judges whether correction is possible or impossible. Contrastingly, in the case that the signal Si is in stable condition, the threshold for the equivalent CN ratio may be set to a value near to the above minimum value at which error correction is possible, because it is believed that the CN ratio does not vary in a short period of time. Thereby, a necessary control of the controller 4 can be ensured more surely.

The estimated value calculating section 92 may use not information on CN ratio sent from the detecting section 35 but MER that indicates deviation of constellation from a specified value, sent from the FFT section 33. Or, assuming that the noise component is a Gaussian noise, the CN ratio given by the Expression 2 can be equivalently obtained from MER. Or, from the error rate sent from the error correcting section 36 and the noise quantity derived by the error estimating section 91, the correction possibility judging section 93 may judge whether correction is possible or impossible.

On the basis of the result of the judgment of the correction possibility judging section 93, the operation controlling section 94 controls each circuit element of the tuner 2 and demodulator 3. If the correction possibility judging section 93 has decided that errors to be generated due to the control can not be corrected, the operation controlling section 94 changes the quantity of the control so as to decrease errors to be generated due to the control. Changing the quantity of the control includes stopping the control itself.

For example, if a control that decreases by W, which is more than zero, the power consumption of a circuit element included in the tuner 2, causes generation of some errors, the errors to be generated due to the control that decreases the power consumption, decreases by stopping the control that decreases the power consumption, or by performing the control to decrease the power consumption by a less decrease quantity. Therefore, if the correction possibility judging section 93 has decided that errors estimated to be generated due to the control that decreases the power consumption by W, can not be corrected, the operation controlling section 94 stops the control of the circuit element to decrease the power consumption by W, or changes the control into a control that decreases the power consumption by V, which is less than W but more than zero. Likewise, if a control of the RF amplifier 21 or the like that increases the degree of amplification of the received signal by U, which is more than zero, causes generation of errors, and the correction possibility judging section 93 has decided that the errors can not be corrected, the operation controlling section 94 stops the control that changes the degree of amplification of the received signal, or changes the control into a control that changes the degree of amplification of the received signal by T, which is less than U but more than zero.

When the correction possibility judging section 93 has decided that errors to be generated due to a control can be corrected, the operation controlling section 94 performs the control without changing the degree of the control. For example, when the correction possibility judging section 93 has decided that the error to be generated due to the control that decreases by W, which is more than zero, the power consumption of a circuit element included in the tuner 2, the operation controlling section 94 performs without any change the control that decreases by W, which is more than zero, the power consumption of the circuit element included in the tuner 2.

When the correction possibility judging section 93 has decided that errors to be generated due to a control can be corrected, it is thinkable that there is a room in which errors to be generated due to the control can be corrected even if the degree of the control is increased. Therefore, when the correction possibility judging section 93 has decided that errors can be corrected, the operation controlling section 94 may perform the control with an increased degree of the control. In this case, the operation controlling section 94 may hold therein a table or function in which an increase in the quantity of errors corresponding to an increase in the degree of a control is related to a circuit element to be controlled and the contents of the control. On the basis of the table or function, the operation controlling section 94 may determine an amount of an increase in the degree of the control within a range in which errors can be corrected.

As shown in FIG. 5, affection of the noise 74 due to the control performed in the range of the symbol 73 spreads over the range of a time interleaving length Li. The operation controlling section 94 controls a circuit element of the tuner 2 or the like with temporally separating control timings by more than the time interleaving length Li so that the ranges of errors due to the noise 74 do not overlap after time deinterleaving, as shown in FIG. 5. Thus, errors caused by a plurality of controls do not overlap, and the error correcting section 36 can more surely correct errors in the signal Si.

As shown in FIG. 5, a control of the controller 4 is preferably started in time with the leading edge of a symbol. Thereby, the number of symbols affected by errors to be generated due to the control becomes the minimum, and the number of symbols in which errors can not be corrected becomes the minimum. More specifically, the operation controlling section 94 forecasts a timing at which a circuit element to be controlled in operation deals with the signal Si. The operation controlling section 94 then starts controlling the operation of the circuit element just simultaneously with the timing at which the circuit element deals with the leading edge of a symbol included in the signal Si.

The operation controlling section 94 gives the information on the control start timing to the wave equalizing section 37. On the basis of the information on the control start timing given by the operation controlling section 94, the wave equalizing section 37 performs wave equalization by using a scattered pilot signal. At this time, because the scattered pilot signal corresponding to the timing at which the control was performed by the operation controlling section 94, is inaccurate, reliability weighting is performed on the assumption that the scattered pilot signal is low in reliability. The wave equalization is then performed on the basis of the weighting. This can decrease the affection of errors generated due to the control of the controller 4.

In another case, the information on the control start timing determined by the operation controlling section 94 as described above, may be given to the error correcting section 36 so that the error correcting section 36 can improve by itself its error correction performance on the basis of the information on the control start timing. Thereby, the correction performance for correcting errors generated due to the control can surely ensured.

Next, an example of error correction in data included in a signal encoded by convolution coding such as Viterbi coding, will be described. When convolution coding is performed to a signal, a coding signal is output that is dependent on the arrangement order of one or more data precedent to each data included in the input signal. On the other hand, in a data string in which a predetermined amount of data is successive, a weight is set in advance for each arrangement order of data on the basis of the intensity of the input signal. On the basis of the preset weight, a data string that is not in its original data arrangement because of generation of errors, is corrected to a data string that is in an arrangement order near the right arrangement order before the generation of the errors.

On the basis of the above, the above-described change in performance of error correction may be performed as follows. That is, when a control is performed by the operation controlling section 94, an error is generated in the signal at a portion corresponding to a control start timing, and thus the reliability of the signal at the position decreases. Therefore, the accurate data arrangement can be no longer reproduced by the preset weight as described above. Thus, the weight for the data string including the data at the position corresponding to the control start timing is changed into a weight that decreases the reliability of the data at the position. Error correction is then performed on the basis of the changed weight. Thereby, the error correction is performed that is more accurate than that based on the reliability having decreased due to the control of the operation controlling section 94.

Figure 7:
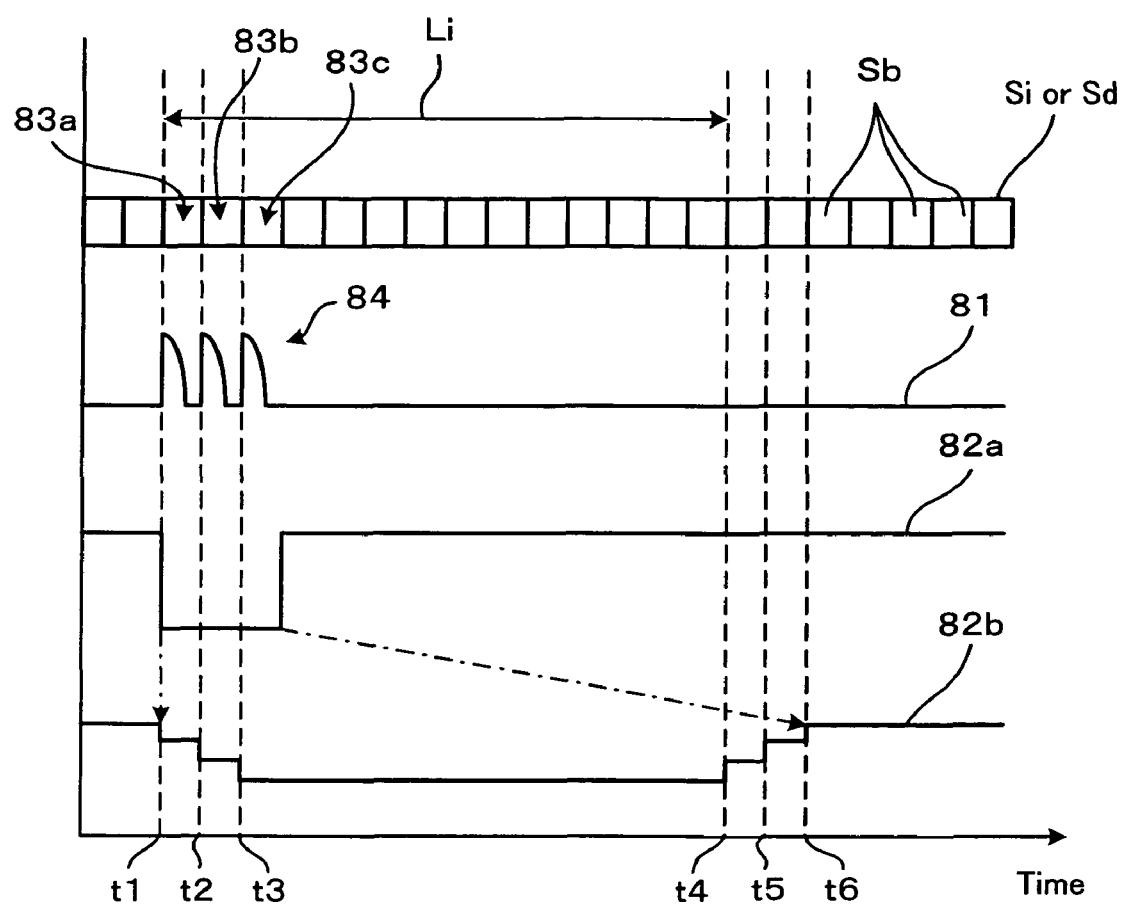
FIG. 7 is a timing chart showing affection on a signal, of a plurality of times of controls of the controller.

When a plurality of times of controls of the controller 4 are performed in the range of a time interleaving length, errors overlap that are generated due to the respective controls. FIG. 7 is a timing chart in the case that a plurality of times of controls are performed.

As shown by a curved line 81, noises 84 due to three times of controls appear in the range of a time interleaving length. A curved line 82a shows the CN ratios on symbols 83a, 83b, and 83c affected by the noises 84. After time deinterleaving, the affection on the symbols 83a to 83c is dispersed as shown by a curved line 82b. That is, the affection on the symbols 83a to 83c is dispersed to a period of times t1 to t4, a period of times t2 to t5, and a period of times t3 to t6. Thus, the affections of the periods appear with being overlapped.

Even in the above case, the controller 4 controls the operation of a circuit element of the tuner 2 or the like, on the basis of judgment as to whether or not errors expected to be generated due to a plurality of times of controls can be corrected. More specifically, the error estimating section 91 estimates the quantity of noises 84 to be generated due to the control, and specifies the symbols 83a to 83c to be affected by the noises. That is, in FIG. 7, the times t1, t2, and t3 at the positions where the respective noises 84, are specified. Next, the estimated value calculating section 92 calculates equivalent CN ratios on the basis of the noises 84 estimated by the error estimating section 91 and the positions of the specified symbols 83a to 83c. Thereby calculated are the equivalent CN ratio of the period of the times t1 to t2 and the times t5 to t6, the equivalent CN ratio of the period of the times t2 to t3 and the times t4 to t5, and the equivalent CN ratio of the period of the times t3 to t4. The correction possibility judging section 93 judges the possibility of correction by comparing each equivalent CN ratio derived by the estimated value calculating section 92, with a threshold. On the basis of the result of the judgment, the operation controlling section 94 controls the operation of a circuit element.

As described above, by specifying symbols to be affected by noises, that is, error symbols, the state of overlap of errors to be generated due to the noises and the difference in equivalent CN ratio between periods, can be accurately derived. Thus, even in the case that a plurality of times of controls are performed in the range of a time interleaving length, it can be accurately judged whether error correction is possible or impossible.

Figure 8:
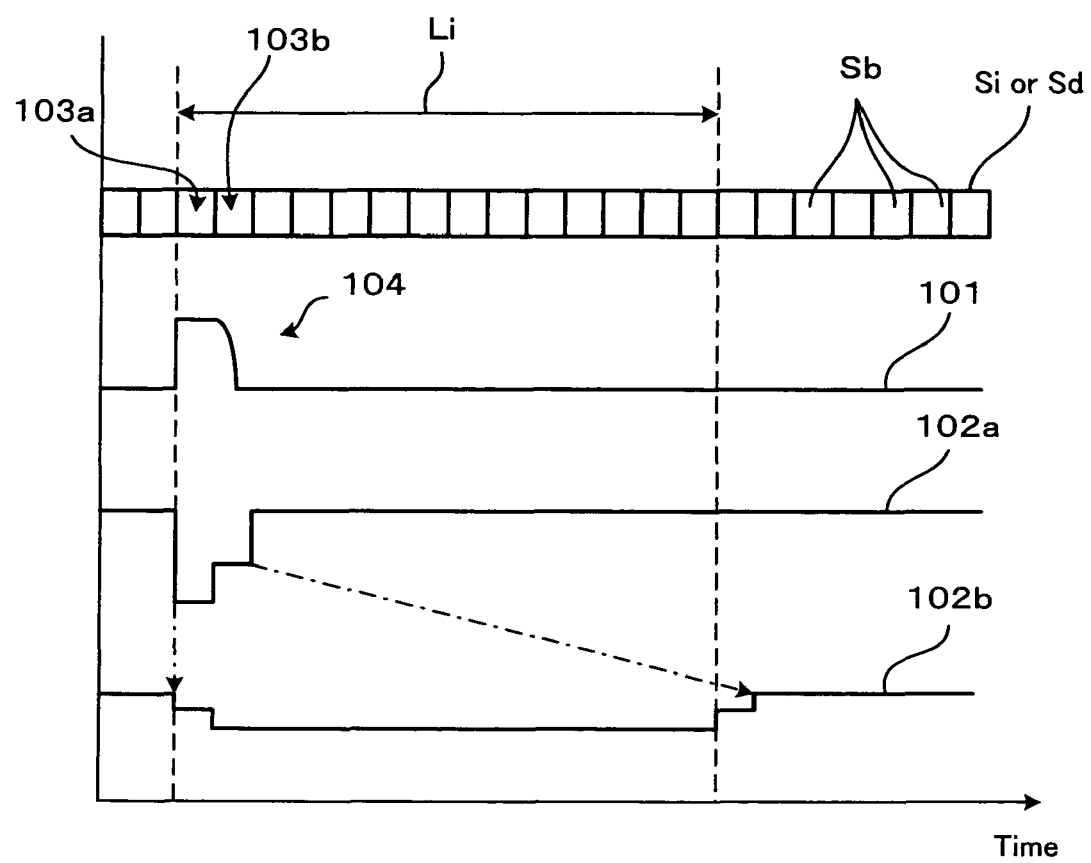
FIG. 8 is a timing chart showing affection on a signal, of the control of the controller over symbols.

A case wherein affection of a single time of control appears on the signal Si over two symbols, as shown by a noise 104 in FIG. 8, is similar to the case wherein a plurality of times of controls are performed. That is, affections of noises generated in the ranges of respective symbols 103a and 103b due to a single time of control, appear with being overlapped as shown by a curved line 102b that represents the quantity of error after time deinterleaving. Even in this case, like the above case wherein a plurality of times of controls are performed, the controller 4 controls the operation of a circuit element of the tuner 2 or the like on the basis of judgment as to whether or not the errors can be corrected.

[General Flow]

Figure 9:
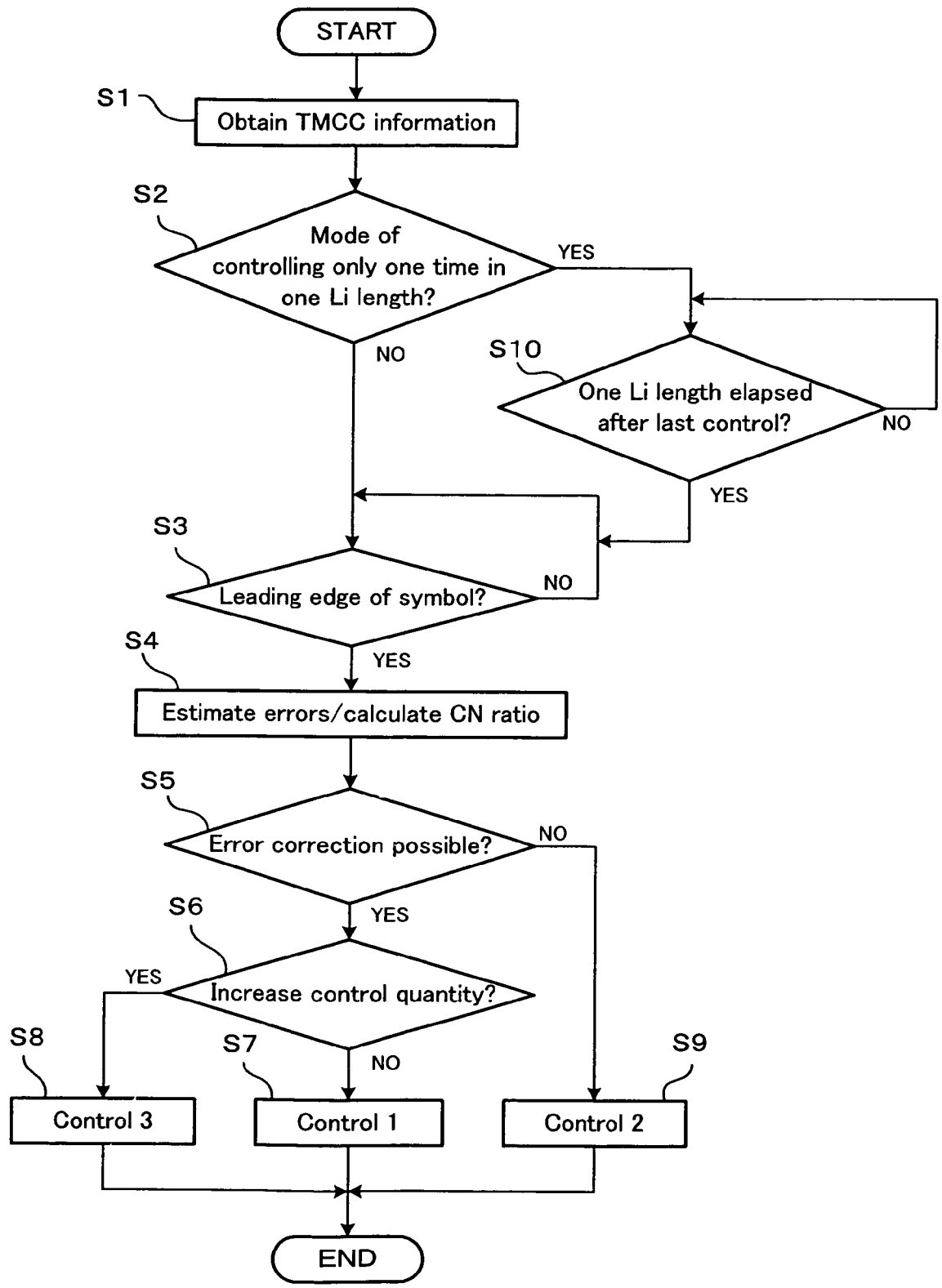
FIG. 9 is a flowchart showing a general procedure of the control of the controller.

Next, a general flow of a control of a circuit element of the tuner 2 or the like on the basis of judgment by the controller 4 as to whether or not errors can be corrected, will be described. FIG. 9 is a flowchart showing the general flow.

First, in Step S1, the controller 4 obtains from the demodulator 3 TMCC information including a mode of an effective symbol length and a transmission method of the received signal. Next, in Step S2, the controller 4 judges whether the present mode is a mode in which a plurality of times of control are performed to a circuit element of the tuner 2 or the like in the range of an time interleaving length, which mode is hereinafter referred to as mode A, or a mode in which only one time of control is performed in the temporal range of the time interleaving length, which mode is hereinafter referred to as mode B. The mode has been set in advance to the mode A or B in accordance with conditions of the received signal and/or the kind of control to be performed by the controller 4. When the controller 4 has judged the present mode to be the mode A, that is, NO in Step S2, the controller 4 then judges in Step S3 whether or not the present time is a timing at which an error is generated at the leading edge of a symbol due to the control of the circuit element at the present time. When the controller 4 has decided that the present time is not the timing at which an error is generated at the leading edge of a symbol due to the control of the circuit element at the present time, that is, NO in Step S3, the flow then returns to Step S3.

On the other hand, when the controller 4 has decided in Step S3 that the present time is a timing at which an error is generated at the leading edge of a symbol due to the control of the circuit element at the present time, that is, YES in Step S3, the error estimating section 91 then estimates the quantity of errors expected to be generated due to the control, and specifies a symbol in which the errors are expected to be generated, in Step S4. In addition, the estimated value calculating section 92 calculates an equivalent CN ratio from the quantity of errors estimated by the error estimating section 91 and the position of the symbol specified by the error estimating section 91, in Step S4. In a modification, the equivalent CN ratio may be calculated on the basis of an error rate derived by the error correcting section 36 of the demodulator 3.

Next, in Step S5, the correction possibility judging section 93 judges whether or not the error correcting section 36 can correct errors expected to be generated due to the control of the controller 4. When the correction possibility judging section 93 has decided that the errors can not be corrected, that is, NO in Step S5, the operation controlling section 94 performs the control after changing the quantity of the control, or stops the control itself, as a control 2 in Step S9. The control of the controller 4 then ends.

On the other hand, when the correction possibility judging section 93 has decided in Step S5 that the errors to be generated due to the control of the controller 4 can be corrected, that is, YES in Step S5, the operation controlling section 94 then judges in Step S6 whether or not the quantity of the control should be increased. Whether the quantity of the control should be increased is judged on the basis of whether the difference is wide between the equivalent CN ratio calculated by the estimated value calculating section 92 and the threshold of the equivalent CN ratio at which the errors can be corrected.

When the operation controlling section 94 has decided in Step S6 that the quantity of the control should be increased, that is, YES in Step S6, the operation controlling section 94 then determines the quantity of an increase in the quantity of the control within a range in which the errors can be corrected, and then controls the circuit element after increasing the quantity of the control by the determined quantity of the increase, as a control 3 in Step S8. The control of the controller 4 then ends. On the other hand, when the operation controlling section 94 has decided in Step S6 that the quantity of the control should not be increased, that is, NO in Step S6, the operation controlling section 94 then controls the circuit element without changing the quantity of the control, as a control 1 in Step S7. At this time, the operation controlling section 94 may perform the control with the error correcting section 36 improving its error correction performance by itself on the basis of information on control start timing. The control of the controller 4 then ends.

When the controller 4 has decided in Step S2 that the present control mode is the mode B, the flow then advances to Step S10, in which the controller 4 judges whether or not a time period not less than one time interleaving length has elapsed after the last control. When the controller 4 has decided that a time period not less than one time interleaving length has elapsed, that is, YES in Step S10, the flow then advances to Step S3. When the controller 4 has decided that a time period not less than one time interleaving length has not yet elapsed, that is, NO in Step S10, the processing of Step S10 is repeated.

[Modification]

Modifications of the embodiment will be described.

In the above-described embodiment, time interleaving is used in which symbols are rearranged such that each symbol is put at a temporally later position than the position before interleaving. However, the present invention may be applied to a case wherein block interleaving is adopted in which rearrangement is performed within a block of a predetermined range in a signal. Or, the present invention may be applied to a case wherein byte deinterleaving is performed in which rearrangement is performed such that each symbol is put at a temporally later position than the position before interleaving, like time deinterleaving.

Or, the control as described above may be performed in accordance with processing of frequency deinterleaving. In this case, the correction possibility judging section 93 judges whether or not errors having been dispersed by frequency deinterleaving can be corrected by the error correcting section 36. Or, in accordance with the range in which errors are dispersed by frequency deinterleaving, it is judged whether the control should be performed; how many times of controls should be performed; and so on.

In the above-described embodiment, it is assumed that the signal is in stable condition. However, the present invention can be applied to a case wherein the signal is in unstable condition. For example, although a mean equivalent CN ratio in a unit of time interleaving length is calculated by the above-described Expression 3, a CN ratio in a less unit may be calculated. Because a more accurate CN ratio can be calculated thereby, it can surely be judged whether or not errors can be corrected, even in the case that the signal is in unstable condition and the intensity No of noise in the Expression 3 varies in a short period of time.

In the above-described embodiment, one control is performed in one symbol. However, a plurality of controls may be performed in the same symbol. In this case, a CN ratio is calculated by using a value obtained by summing noises due to two controls derived by the error estimating section 91.

In the above-described embodiment, the controller 4 is formed outside the tuner 2 and the demodulator 3. However, parts of the controller 4 may be formed inside the tuner 2 or the demodulator 3. Or, the controller 4 may be constituted by a host CPU in an information terminal device such as a cellular phone in which the digital demodulating apparatus of the embodiment of the present invention is adopted, and a computer program that causes the CPU to function as the controller 4.

In the above-described embodiment, a control of the controller 4 is performed in time with the leading edge of a symbol. However, the control may be performed at any timing.

In the above embodiment, the digital demodulating apparatus is described that mainly deals with digital signals according to the ISDB-T system. When the present invention is applied to a digital demodulating apparatus that deals with digital signals according to another transmission system than the ISDB-T system, technical terms applied mainly to the ISDB-T system in the above-described embodiment may be replaced by those corresponding to the respective technical terms in the other transmission system than the ISDB-T system. For example, in the above-described embodiment, the detecting section 35 takes out TMCC information from the received signal. In the case of another transmission system, however, a digital demodulating apparatus may have a feature that information corresponding to TMCC information as information on the signal transmission system is taken out from the received signal.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A digital demodulating apparatus comprising:
a plurality of circuit elements constituting a tuner that performs channel select processing to a received signal that has been interleaved, and a demodulator that performs demodulation processing to the received signal from the tuner;
a deinterleaving section that performs deinterleave processing to the interleaved received signal from the tuner;
an error correcting section that corrects errors included in the received signal that has been deinterleaved by the deinterleaving section; and
a circuit element controlling section that controls an operation of at least one of the plurality of circuit elements, the circuit element controlling section estimating the quantity of hypothetical errors to be generated in the received signal due to a control of an operation of a circuit element, the circuit element controlling section judging from the estimated quantity of hypothetical errors whether or not the error correcting section can correct errors to be included in the received signal due to the control of the operation of the circuit element, the circuit element controlling section controlling the operation of the circuit element so as to decrease the quantity of errors to be generated in the received signal due to the control of the operation of the circuit element, when the circuit element controlling section has decided that the error correcting section can not correct the errors to be included in the received signal.

2. The apparatus according to claim 1, wherein the circuit element controlling section changes the quantity of the control of the operation of the circuit element so as to decrease the quantity of errors to be generated in the received signal due to the control of the operation of the circuit element, when the circuit element controlling section has decided that the error correcting section can not correct the errors to be included in the received signal, and the circuit element controlling section does not change the quantity of the control of the operation of the circuit element when the circuit element controlling section has decided that the error correcting section can correct the errors to be included in the received signal.

3. The apparatus according to claim 2, wherein the circuit element controlling section controls the circuit element so as not to change the operation of the circuit element, when the circuit element controlling section has decided that the error correcting section can not correct the errors to be included in the received signal.

4. The apparatus according to claim 1, wherein the control to be performed by the circuit element controlling section is a control to change the power consumption of the circuit element.

5. The apparatus according to claim 1, wherein the circuit element controlling section comprises a CN ratio estimating section that estimates a CN ratio of the received signal in which the hypothetical errors are to be generated due to the control of the operation of the circuit element.

6. The apparatus according to claim 5, wherein the circuit element controlling section comprises a threshold deriving section that derives a threshold of a CN ratio of the received signal, and the circuit element controlling section decides that the error correcting section can correct the hypothetical errors to be included in the received signal due to the control of the operation of the circuit element by the circuit element controlling section, when a CN ratio of the received signal estimated by a CN ratio estimating section exceeds the threshold of the CN ratio of the received signal derived by the threshold deriving section.

7. The apparatus according to claim 6, wherein the threshold deriving section derives the threshold of the CN ratio of the received signal on the basis of at least one of a demodulation method, a coding rate, and an effective symbol length of the received signal.

8. The apparatus according to claim 7, wherein the threshold deriving section is provided in the tuner, and the tuner receives, from the demodulator, information on at least one of the demodulation method, the coding rate, and the effective symbol length of the received signal.

9. The apparatus according to claim 1, wherein the circuit element controlling section comprises an error quantity deriving section that derives the quantity of errors before control, included in the received signal before the control of the operation of the circuit element, and the circuit element controlling section judges from the estimated quantity of hypothetical errors and the quantity of errors before control derived by the error quantity deriving section whether or not the error correcting section can correct errors to be included in the received signal.

10. The apparatus according to claim 9, wherein the error quantity deriving section comprises an error rate deriving section that derives an error rate of the received signal before the control of the operation of the circuit element by the circuit element controlling section.

11. The apparatus according to claim 9, wherein the error quantity deriving section comprises a deviation deriving section that derives a deviation, from a specified value, of constellation of the received signal before the control of the operation of the circuit element by the circuit element controlling section.

12. The apparatus according to claim 1, wherein the circuit element controlling section comprises a timing determining section that determines a timing at which the circuit element controlling section controls the operation of the circuit element.

13. The apparatus according to claim 12, further comprising a wave equalizing section that performs wave equalization on the basis of reliability of a scattered pilot signal included in the received signal at the timing for controlling the circuit element, determined by the timing determining section.

14. The apparatus according to claim 13, wherein the timing determining section and the wave equalizing section are provided in the tuner and the demodulator, respectively, and the demodulator receives, from the tuner, information on the timing for controlling the circuit element, determined by the timing determining section.

15. The apparatus according to claim 12, wherein the timing determining section determines the timing for controlling the operation of the circuit element such that an error to be included in the received signal due to the control of the operation of the circuit element is put at a leading edge of one symbol included in the received signal.

16. The apparatus according to claim 12, wherein the circuit element controlling section further comprises a performance changing section that changes the error correction performance of the error correcting section on the basis of reliability of the received signal at the timing for controlling the circuit element, determined by the timing determining section.

17. The apparatus according to claim 16, wherein the timing determining section and the error correcting section are provided in the tuner and the demodulator, respectively, and the demodulator receives, from the tuner, information on the timing for controlling the circuit element, determined by the timing determining section.

18. The apparatus according to claim 1, wherein the tuner comprises an RF amplifier section, a mixer section, a filter section, an IF amplifier section, and a VCO-PLL section, and at least one of the RF amplifier section, the mixer section, the filter section, the IF amplifier section, and the VCO-PLL section, is to be controlled by the circuit element controlling section.

19. The apparatus according to claim 1, wherein the circuit element controlling section controls the circuit element such that regions occupied by errors to be generated due to a plurality of controls by the circuit element controlling section do not overlap each other in the deinterleaved received signal.

20. The apparatus according to claim 19, wherein the deinterleave processing to be performed by the deinterleaving section is time deinterleave processing in which a plurality of symbols included in the received signal are temporally rearranged, and
the number of times of controls of the operation of the circuit element by the circuit element controlling section in a range of a time interleaving length is not more than one.

21. The apparatus according to claim 1, wherein the deinterleave processing to be performed by the deinterleaving section is time deinterleave processing in which a plurality of symbols included in the received signal are temporally rearranged;
the circuit element controlling section comprises an error symbol specifying section that specifies an error symbol in which a hypothetical error is generated due to the control of the operation of the circuit element; and
the circuit element controlling section judges from the quantity of hypothetical errors estimated by the circuit element controlling section and the error symbol specified by the error symbol specifying section whether or not the error correcting section can correct errors to be included in the received signal due to a plurality of times of controls by the circuit element controlling section when the circuit element controlling section performs the plurality of times of controls in a range of a time interleaving length.

22. The digital demodulating apparatus, according to claim 1, wherein
the circuit element controlling section estimates the quantity of hypothetical errors, on the basis of at least one of (i) which one or more of the circuit elements is/are to be subjected to operation control and (ii) contents of control to be performed.

23. The digital demodulating apparatus, according to claim 22, wherein
the circuit element controlling section estimates the quantity of hypothetical errors, on the basis of a table in which a circuit element, contents of control, and a quantity of errors are associated with one another, or a function by which a quantity of errors is derived from a circuit element and contents of control.

24. A controlling method of a digital demodulating apparatus comprising a plurality of circuit elements constituting a tuner that performs channel select processing to a received signal that has been interleaved, and a demodulator that performs demodulation processing to the received signal from the tuner; a deinterleaving section that performs deinterleave processing to the interleaved received signal from the tuner; an error correcting section that corrects errors included in the received signal that has been deinterleaved by the deinterleaving section; and a circuit element controlling section that controls an operation of at least one of the plurality of circuit elements,
the method comprising:
an estimating step of estimating the quantity of hypothetical errors to be generated in the received signal due to a control of an operation of a circuit element by the circuit element controlling section;
a correction possibility judging step of judging from the quantity of hypothetical errors estimated in the estimating step whether or not the error correcting section can correct errors to be included in the received signal due to the control of the operation of the circuit element by the circuit element controlling section; and
a circuit element controlling step of allowing the circuit element controlling section to control the operation of the circuit element so as to decrease the quantity of errors to be generated in the received signal due to the control of the operation of the circuit element by the circuit element controlling section, when it was decided in the correction possibility judging step that the error correcting section can not correct errors to be included in the received signal.

25. The method according to claim 24, wherein the method further comprises an error rate deriving step of deriving an error rate of the received signal before the control of the operation of the circuit element by the circuit element controlling section, and
it is judged in the correction possibility judging step from the quantity of hypothetical errors estimated in the estimating step and the error rate before control, derived in the error rate deriving step, whether or not the error correcting section can correct errors to be included in the received signal.

26. The method according to claim 24, wherein the deinterleave processing to be performed by the deinterleaving section is time deinterleave processing in which a plurality of symbols included in the received signal are temporally rearranged, and
the number of times of controls of the operation of the circuit element by the circuit element controlling section in a range of a time interleaving length is not more than one.

27. A computer-readable recording medium recording thereon a computer program product for a digital demodulating apparatus comprising a plurality of circuit elements constituting a tuner that performs channel select processing to a received signal that has been interleaved, and a demodulator that performs demodulation processing to the received signal from the tuner; a deinterleaving section that performs deinterleave processing to the interleaved received signal from the tuner; an error correcting section that corrects errors included in the received signal that has been deinterleaved by the deinterleaving section; and a circuit element controlling section that controls an operation of at least one of the plurality of circuit elements,
the product causing the apparatus to perform:
an estimating step of estimating the quantity of hypothetical errors to be generated in the received signal due to a control of an operation of a circuit element by the circuit element controlling section;
a correction possibility judging step of judging from the quantity of hypothetical errors estimated in the estimating step whether or not the error correcting section can correct errors to be included in the received signal due to the control of the operation of the circuit element by the circuit element controlling section; and
a circuit element controlling step of allowing the circuit element controlling section to control the operation of the circuit element so as to decrease the quantity of errors to be generated in the received signal due to the control of the operation of the circuit element by the circuit element controlling section, when it was decided in the correction possibility judging step that the error correcting section can not correct errors to be included in the received signal.

28. A digital receiver comprising a digital demodulating apparatus comprising:
- a plurality of circuit elements constituting a tuner that performs channel select processing to a received signal that has been interleaved, and a demodulator that performs demodulation processing to the received signal from the tuner;
- a deinterleaving section that performs deinterleave processing to the interleaved received signal from the tuner;
- an error correcting section that corrects errors included in the received signal that has been deinterleaved by the deinterleaving section; and
- a circuit element controlling section that controls an operation of at least one of the plurality of circuit elements,
- the circuit element controlling section estimating the quantity of hypothetical errors to be generated in the received signal due to a control of an operation of a circuit element,
- the circuit element controlling section judging from the estimated quantity of hypothetical errors whether or not the error correcting section can correct errors to be included in the received signal due to the control of the operation of the circuit element,
- the circuit element controlling section controlling the operation of the circuit element so as to decrease the quantity of errors to be generated in the received signal due to the control of the operation of the circuit element, when the circuit element controlling section has decided that the error correcting section can not correct the errors to be included in the received signal, the receiver performing reproduction processing to at least one of character data, image data, audio data, and program data, on the basis of the received signal demodulated by the digital demodulating apparatus.

* * * * *